Sept. 2, 1958  G. C. RAY  2,850,549
SEPARATION OF CIS AND TRANS ISOMERS
Filed Feb. 6, 1956
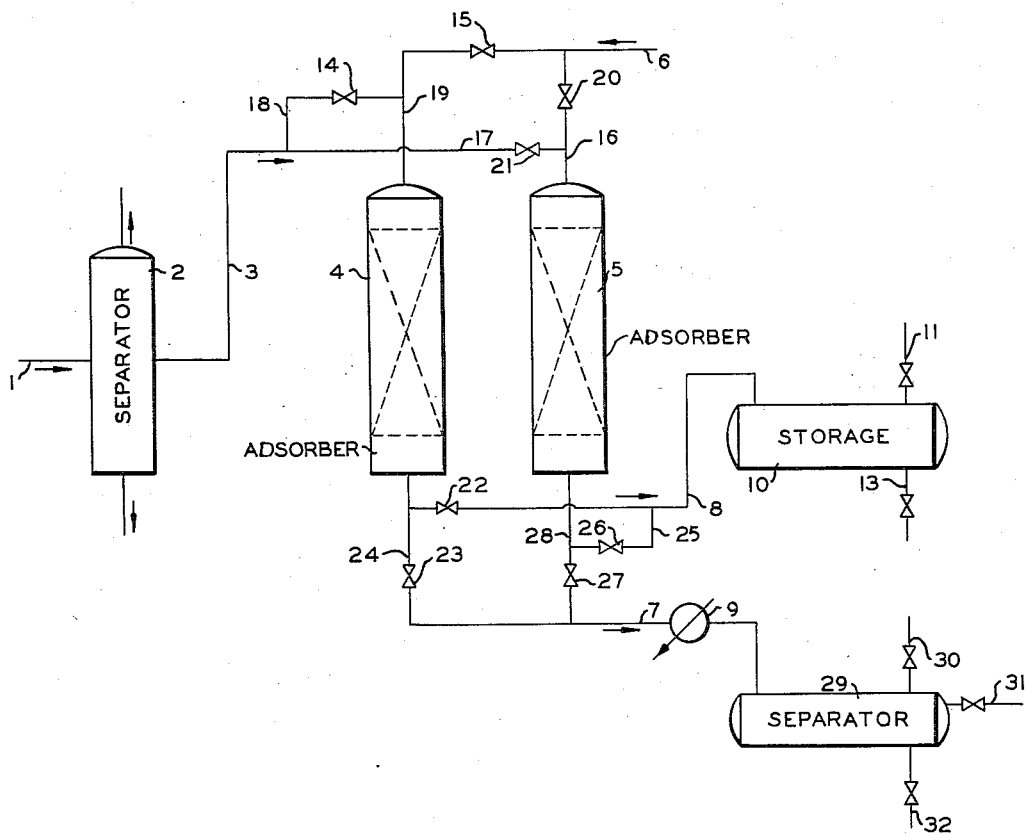
INVENTOR.
G.C. RAY
BY Hudson & Young
ATTORNEYS

United States Patent Office 2,850,549
Patented Sept. 2, 1958

2,850,549

SEPARATION OF CIS AND TRANS ISOMERS

Gardner C. Ray, Bartlesville, Okla., assignor to Phillips Petroleum Company, a corporation of Delaware Application February 6, 1956, Serial No. 563,498

10 Claims. (Cl. 260—677)

This invention relates to the separation of cis and trans isomers. In one aspect it relates to a method for the separation of cis and trans isomers from one another. In another aspect it relates to a method for separating cis and trans isomers from one another in mixtures containing cis and trans isomers as major constituents. The cis and trans isomers to which my invention applies are molecules containing 4, 5 or 6 carbon atoms per molecule.

Cis and trans isomers, useful in chemical research and in chemical processing have been separated from one another as reported in Industrial and Engineering Chemistry, volume 43, page 1182–6 (1951) by azeotropically distilling the mixture of isomers using esters, ketones or ethers as vapor entrainers with the formation of maximum boiling azeotrope of the cis isomer. Another method of separating cis and trans isomers from one another is described in British Patent 671,563 in which trans isomers form urea complexes with urea while the cis isomers do not.

An object of this invention is to provide a method for the separation of cis and trans isomers from one another.

Another object of this invention is to provide an easily operable method for separating cis isomers from mixtures containing cis and trans isomers.

Still another object of this invention is to provide a method for separating chlorine and hydroxyl derivatives of cis isomers having from 4 to 6 carbon atoms per molecule from the corresponding derivatives of the trans isomers.

Still other objects and advantages of my invention will be realized upon reading the following description which taken with the attached drawing forms a part of this specification.

By the term Linde 5A sieve is meant a composition of predominantly calcium and sodium aluminosilicates with minor amounts of such impurities as iron, magnesium, lead and boron compounds. A naturally occurring mineral called chabazite also contains calcium, and sodium aluminosilicates. When made synthetically the composition contains appreciable amounts of sodium and the calcium to sodium ratio can be controlled within certain limits. The natural mineral as well as the synthetic material contains pores of measurable size and possesses the property of selective adsorption. The synthetic material possesses pores of more nearly uniform size than the natural mineral called chabazite, a member of the zeolite group. In the Linde 5A sieve with little to no sodium the pore size of the major proportion of pores is about 5 angstrom units while the presence of little or no calcium yields a material having a major proportion of pores of about 4 angstrom units, which material is known as Linde type 4A sieve.

The adsorbent material herein described is termed in this specification and claims a synthetic chabazite because of the relationship of the natural mineral chabazite and the synthetic material in composition and in adsorptive properties. Mineralogy reference books define natural chabazite as a hydrous calcium aluminosilicate of the zeolite group. Sodium or potassium can replace the calcium, at least in part.

One sample of the synthetic material suitable for separating cis and trans isomers containing 4, 5 and 6 carbon atoms per molecule from one another has the following empirical formula: $0.3Na_2O \cdot 0.7CaO \cdot 1.0Al_2O_3 \cdot 2.0SiO_2$.

This material has a surface area of 518 square meters per gram as determined by the conventional low temperature nitrogen adsorption method. About half the pore volume of this material has a pore size of about 5 angstrom units, the remainder being pores of size much larger than 5 angstroms. The complete substitution of sodium for calcium leads to 4-angstrom pores which adsorb neither the cis nor trans isomers.

This material as far as its action is understood is an adsorbent and sometimes it is referred to as a "molecular sieve" because its pore size is intermediate between the size of the molecules adsorbed and those not adsorbed.

The contacting or treating steps described hereinbelow can be liquid phase contacting or vapor phase contacting, with liquid phase contacting being preferable.

For removing adsorbed isomers from the adsorbent such desorbents as steam, hydrocarbons, nitrogen, or even hydrogen can be used. When using hydrocarbons to desorb an adsorbed isomer from the adsorbent a hydrocarbon is selected which has a sufficiently different boiling point from that of the isomer being desorbed so that the desorbent and isomer can be easily separated as by fractional distillation. In some cases where adsorbent life is relatively unimportant steam is a preferred desorbing agent because it is generally available in a hydrocarbon treatment plant and after condensation, phase separation of the water from the hydrocarbon is simpler. When superheat temperatures are required, they are easily obtainable with steam. As mentioned, nitrogen or even hydrogen can be used. Thus when a gas is used as a desorbing material, gaseous nitrogen, if available, is satisfactory, or if desired, such a material as gaseous methane, ethane, or propane can be used. These latter materials are easily separable from cis and trans isomers containing from 4 to 6 carbon atoms per molecule. Because steam is difficult to desorb from the adsorbents, the use of a suitable hydrocarbon as the desorbing agent is usually preferred. The preferred eluents are normal paraffins having at least 4 carbon atoms per molecule and differing sufficiently from the adsorbed material to make separation by fractional distillation easy.

In order to be separable according to my process, there is a single hydrogen atom bonded to each carbon of a pair of double bonded carbons. Examples of hydrocarbons which are separated from one another according to my invention are cis-2-butene and trans-2-butene; cis-2-pentene and trans-2-pentene; cis-2-hexene and trans-2-hexene; and cis-3-hexene and trans-3-hexene. My invention is specifically adapted to the separation of cis and trans isomer mixtures of $C_4$, $C_5$ and $C_6$ unsubstituted olefins. By the term unsubstituted olefins I mean the cis and trans isomers of $C_4$, $C_5$ and $C_6$ olefin hydrocarbons.

The temperature of the treating or adsorption step of my process when separating cis from trans isomers containing from 4 to 6 carbon atoms per molecule varies from approximately the freezing point of the highest freezing point component being separated to temperatures at which desorption is as rapid as adsorption. These temperature limits are intended to be only approximate. Ambient or atmospheric temperatures are usually preferred because heat exchange is not required.

For desorbing the adsorbed isomer from the adsorbent when treating isomers of 4–6 carbon atoms per molecule, temperatures within the range of about 550° to 650° F. are usually employed when using relatively non-condensible desorbents such as nitrogen, hydrogen or methane. With relatively condensible desorbents such as steam, n-butane and higher molecular weight n-paraffins, a temperature in the range of 250° to 450° F. is usually used. These temperature ranges are merely optimum, and temperatures above and below those given are operable.

Pressures carried on the vessel in which the adsorption step is carried out are not critical. However, sufficient pressure is required to maintain the materials undergoing treatment in the liquid phase in case liquid phase operation is being carried out. Sufficient pressure is ordinarily employed to provide flow of material undergoing treatment through the adsorption vessel at a desired flow rate. Pressures of the desorption operation are not critical and may vary from superatmospheric pressures to pressures below atmospheric.

In the operation of the process of my invention, reference numeral 1 of the drawing identifies a pipe through which a material to undergo treatment is passed from a source, not shown, into a separator 2. Separator 2 is a fractional distillation zone or other type of separation step in which a fraction of material is separated from the charge stock for undergoing treatment in my adsorption step. When a charge stock contains a mixture of many different compounds as usually encountered in petroleum refining operations, it is preferable to separate a fraction comprising the cis and trans isomers for separation according to my invention.

The following data represent the boiling points of the cis and trans isomers separated according to my invention.

| Compound | Cis isomer, °C. | Trans isomer, °C. |
|---|---|---|
| 2-butene | 3.7 | 0.88 |
| 2-pentene | 37.1 | 36.36 |
| 2-hexene | 68.6 | 67.9 |
| 3-hexene | 67.6 | 68.1 |

From the closeness of the boiling points of the isomers of these four pairs of isomers, it is obvious that separation by fractional distillation of the cis from the trans isomer of each pair would be a very difficult operation.

In the operation of my invention a pair of isomers, separated from a complex charge stock in separator 2 by any suitable type of separation, in liquid phase passes through pipes 3 and 18 with valve 14 being opened and valve 15 being closed and on through a pipe 19 into an adsorber 4 which is charged with a quantity of adsorbent Linde 5A sieve material herein called a synthetic chabazite. Liquid not adsorbed passes from adsorber 4 through a pipe 8, a valve 22 therein being opened and valves 23 and 26 being closed, into a run storage vessel 10. A pipe 11 is provided for pressure relief, if necessary, while treated material can be withdrawn through a pipe 13.

When the isomer mixture is to be separated by vapor phase adsorption the charge passes through vessel 4 and unadsorbed vapor passes therefrom via pipes 24 and 8 to a run storage tank 10 or to other disposal as desired.

When vessel 4 becomes charged with adsorbed isomer the feed material is passed through a pipe 17, through valve 21 and pipe 16 into vessel 5, also containing a bed of the synthetic chabazite, with valves 14 and 20 being closed. Treated material from vessel 5 flows through a pipe 28, with valve 27 being closed and valve 26 in pipe 25 being opened, and on through pipe 8 into the storage tank 10. Valve 22 in pipe 8 is closed. While the feed stock is being treated in vessel 5 adsorbed isomer can be removed or desorbed from the adsorbent in vessel 4. This operation involves passage of steam, a hydrocarbon in the vapor state or liquid state, if desired, or nitrogen or other suitable desorbing agent, through pipe 6, valve 15, and pipe 19 into vessel 4 with valves 14 and 20 being closed. This desorbing agent and its charge of desorbed isomer flow from vessel 4 through pipe 24 and valve 23 (valves 22 and 27 being closed) through a pipe 7 and a cooler or condenser 9 into a separator vessel 29. In case the desorbing agent is a normally gaseous hydrocarbon and the desorbed isomer in vessel 29 is a liquid, the desorbing agent is removed from vessel 29 through a pipe 30. In case the desorbing hydrocarbon is a normally liquid hydrocarbon the mixture can be withdrawn either through pipe 31 or 32 to a separation zone for separation of the isomer from the desorbing agent. In case the desorbing agent is steam, the cooler 9 operates as a condenser and condenses the steam to water with the simultaneous cooling of the desorbed isomer and the two liquid phases flow on into separator 29. In this case water is withdrawn through pipe 32 and the recovered isomer is passed through a pipe 31 to such disposal as desired. In case the desorbed isomer is a vapor and the desorbing agent a vapor, some suitable means of separation of these vapors is provided.

When the desorbing operation is carried out at a higher temperature than the adsorption step, it is advisable to pass desorbing agent at a temperature below the desorption temperature through the vessel which has been desorbed or regenerated in order to cool the adsorbent to a temperature suitable for adsorption. After this cooling operation is completed vessel 4 is then in condition for treatment of the cis and trans isomer mixture.

*Example I*

As an example of the operation of my process a mixture of 10.3 grams of cis-2-butene and trans-2-butene comprising 43 mol percent cis-2-butene and 57 mol percent of trans-2-butene was contacted with 19.7 grams of synthetic chabazite adsorbent material in a bomb for 24 hours at a temperature of 25° C., the resultant unadsorbed phase analyzed 36 mol percent cis-2-butene and 64 mol percent trans-2-butene. The nonadsorbed material was removed from the adsorbent by flash distillation, and the adsorbent, still containing the adsorbed material, was heated to 265° C. to remove the adsorbed hydrocarbon. The product recovered from this heating operation analyzed 29.1 mol percent trans-2-butene and 70.9 mol percent cis-2-butene.

These runs illustrate only a one-stage operation and it is obvious that upon passing the unadsorbed phase through successive stages or through a relatively large mass of adsorbent the cis-2-butene can be substantially completely removed from the feed mixture. However, the above data demonstrates that the cis isomer was selectively adsorbed.

While certain embodiments of the invention have been described for illustrative purposes, the invention obviously is not limited thereto.

*Example II*

13.35 grams of a mixture consisting essentially of 32 mol percent cis-2-butene and 68 mol percent trans-2-butene was charged to a bomb containing 49.6 grams of the herein disclosed synthetic chabazite. The bomb and contents were allowed to stand overnight at room temperature. The unadsorbed hydrocarbon analyzed 15 mol percent cis-2-butene and 85 mol percent trans-2-butene.

*Example III*

15 cc. of a blend consisting essentially of 35 mol percent cis-2-pentene and 65 mol percent trans-2-pentene was allowed to stand overnight in contact with 20 grams of the herein disclosed synthetic chabazite. The unadsorbed hydrocarbon analyzed 26 mol percent cis-2-pentene and 74 mol percent trans-2-pentene.

I claim:

1. A method for the separation of the components of a pair of cis and trans isomers containing the same number of carbon atoms per molecule and selected from the pairs of cis and trans isomers of straight chain monoolefinic hydrocarbons having like numbers of carbon atoms per molecule, said pairs of isomers containing 4, 5 and 6 carbon atoms per molecule of isomer, comprising treating said pair of cis and trans isomers with an adsorbent synthetic chabazite, and desorbing the cis isomer from the synthetic chabazite.

2. A method for separating cis-2-butene from a mixture comprising trans-2-butene and said cis-2-butene comprising treating said mixture with a synthetic chabazite and desorbing the said cis-2-butene from said synthetic chabazite.

3. A method for separating cis-2-pentene from a mixture comprising trans-2-pentene and said cis-2-pentene comprising treating said mixture with a synthetic chabazite and desorbing said cis-2-pentene from said synthetic chabazite.

4. A method for separating cis-2-hexene from a mixture comprising trans-2-hexene and said cis-2-hexene comprising treating said mixture with a synthetic chabazite and desorbing said cis-2-hexene from said synthetic chabazite.

5. A method for the separation of the components of a pair of cis and trans isomers containing the same number of carbon atoms per molecule and selected from the pairs of cis and trans isomers of straight chain monoolefinic hydrocarbons having like unmbers of carbon atoms per molecule, said pairs of isomers containing 4, 5 and 6 carbon atoms per molecule of isomer, comprising treating said pair of cis and trans isomers with an adsorbent synthetic chabazite, removing unadsorbed material from the adsorbent, and desorbing adsorbed material containing a greater concentration of said cis isomer than the concentration of the cis isomer in the pair of cis and trans isomer material fed to the treating operation.

6. A method for separating cis-2-butene from a feed stock mixture comprising trans-2-butene and cis-2-butene, comprising, treating said feed stock mixture with an adsorbent synthetic chabazite, removing unadsorbed material from the adsorbent and desorbing adsorbed material from the adsorbent containing a greater concentration of cis-2-butene than the concentration of cis-2-butene in said feed stock mixture.

7. A method for separating cis-2-pentene from a feed stock mixture comprising trans-2-pentene and cis-2-pentene, comprising, treating said feed stock mixture with an adsorbent synthetic chabazite, removing unadsorbed material from the adsorbent and desorbing adsorbed material from the adsorbent containing a greater concentration of cis-2-pentene than the concentration of cis-2-pentene in said feed stock mixture.

8. A method for separating cis-2-hexene from a feed stock mixture comprising trans-2-hexene and cis-2-hexene, comprising, treating said feed stock mixture with an adsorbent synthetic chabazite, removing unadsorbed material from the adsorbent and desorbing adsorbed material from the adsorbent containing a greater concentration of cis-2-hexene than the concentration of cis-2-hexene in said feed stock mixture.

9. A method for separating cis-3-hexene from a mixture comprising trans-3-hexene and said cis-3-hexene comprising treating said mixture with a synthetic chabazite and desorbing said cis-3-hexene from said synthetic chabazite.

10. A method for separating cis-3-hexene from a feed stock mixture comprising trans-3-hexene and cis-3-hexene comprising treating said feed stock mixture with an adsorbent synthetic chabazite, removing unadsorbed material from the adsorbent and desorbing adsorbed material from the adsorbent containing a greater concentration of cis-3-hexene than the concentration of cis-3-hexene in said feed stock mixture.

References Cited in the file of this patent

UNITED STATES PATENTS

| 2,306,610 | Maling | Dec. 29, 1942 |
| 2,442,191 | Black | May 25, 1948 |

FOREIGN PATENTS

| 671,563 | Great Britain | May 7, 1952 |

OTHER REFERENCES

Marschner: Chem. and Engineering News, vol. 33, No. 6, Feb. 7, 1955, pages 494–496.